Aug. 27, 1929. A. L. HEURICH ET AL 1,726,299
INTERNAL COMBUSTION ENGINE
Filed April 15, 1927
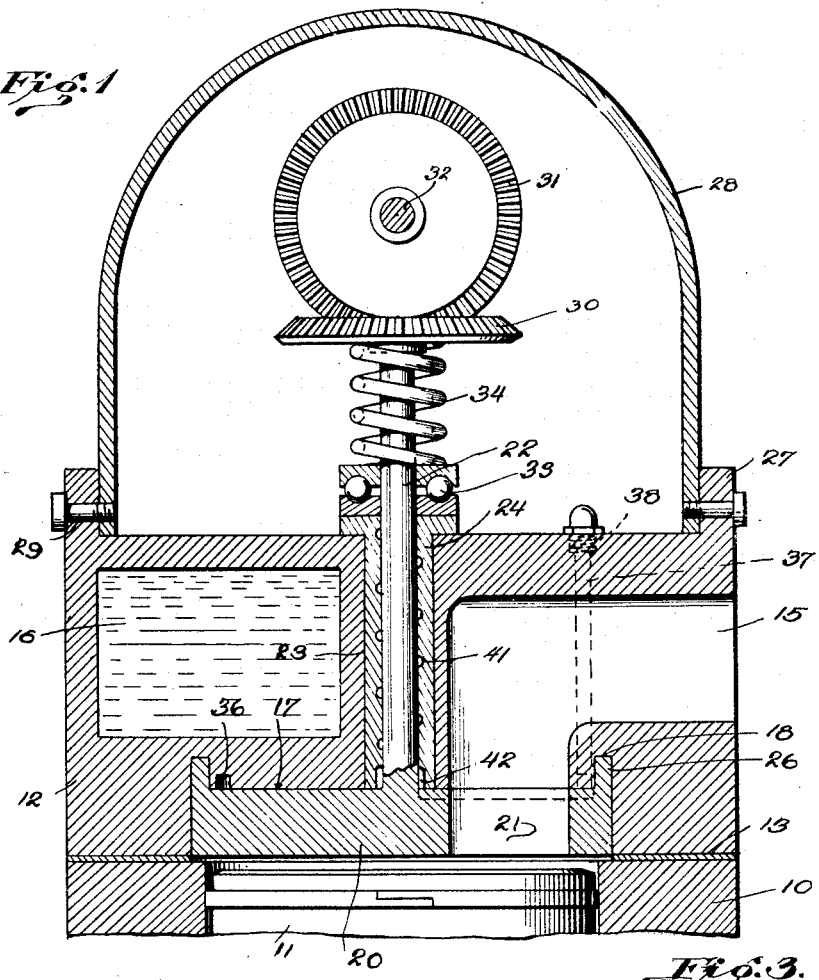

Patented Aug. 27, 1929.

1,726,299

UNITED STATES PATENT OFFICE.

ADAM L. HEURICH, JOSEPH G. HEURICH, AND ARTHUR C. STAPEL, OF PITTSBURGH, PENNSYLVANIA.

INTERNAL-COMBUSTION ENGINE.

Application filed April 15, 1927. Serial No. 184,110.

This invention relates to internal combustion engines and to rotary valves designed for use therewith.

More specifically, the invention relates to rotary valves of the disk type preferably arranged in the cylinder head and adapted to be operated by a valve stem passing thru the cylinder head and driven thru suitable gearing from the crank shaft of the engine. The invention further relates to the lubrication of the valve to prevent wear of the valve and its seat.

One of the objects of the present invention is to provide a valve mechanism of the above character in a complete unit adapted to be mounted in the cylinder head of the engine.

A further object of the invention is to provide a rotary valve for combustion engines which is rugged and durable in construction and noiseless in operation.

A further object is to provide a rotary valve mechanism of the above character which is lubricated throughout the moving contact surfaces of the valve disk and stem.

Other objects will be in part obvious from the annexed drawing and in part indicated from the following analysis of the invention, in which reference is made to the accompanying drawings illustrating one embodiment of my idea.

In these drawings—

Fig. 1 is a vertical transverse section thru a portion of the engine casing illustrating the valve construction;

Fig. 2 is an under face view of a portion of the cylinder head; and

Fig. 3 is a plan, looking from the top, of the valve unit.

In the drawings, 10 is the engine cylinder suitably bored for the reception of a piston 11, and 12 is a cylinder head mounted on the cylinder. Between the cylinder and head, suitable packing, such as a gasket 13, is disposed. The head 12 is provided with an intake passage 14 and an exhaust passage 15 communicating with the cylinder bore and has formed therein a water space 16 for the cooling fluid.

The under face of the head is cylindrically bored, as indicated at 17, to provide a valve seat, and is provided with an annular recess 18 of substantially greater depth than the depth of the bore, the said recess 18 extending throughout the periphery of the bore 17. A valve disk 20 provided with a port 21 is mounted on the seat in the bore 17, and has a valve stem 22 extending upwardly thru a suitable bore 23 in the cylinder head, the said bore being provided with a bushing 24 of bronze or other wear resisting material, in which the valve stem rotates. The valve disk is formed with a circumferential flange or skirt 26 extending from its upper face and which engages in the annular recess 18 of the head, the lower face of the disk serving as the cylinder end. Flanges 27 at the upper portion on the cylinder head receive a cover or cap 28 for the engine casing, the cap being removably secured to said flanges by bolts 29 or the like. The cover 28 extends substantially the length of the cylinder block. The valve stem 22 projects into this cover, and at its extremity is provided with a drive wheel, such as a bevel gear 30, which is keyed or otherwise secured thereto, and which meshes with bevel gear 31 driven from a shaft 32 which extends the length of the engine block.

A ball thrust bearing 33 is mounted on the valve stem, and between said bearing and drive wheel 30, we provide a coil spring 34 which maintains the valve in seated position and urges the gears 30 and 31 into meshing engagement.

The shaft 32 is mounted in suitable brackets (not shown) for quick removal so that by removing the cover 28 and disconnecting the shaft from its drive mechanism, the said shaft 32 may be removed without disturbing any other parts of the motor or casing. It will be understood that the shaft 32 is operated by any approved train of gearing (not shown) from the crank shaft of the engine and that the valves of adjacent units are rotated therefrom in desired timing relation.

With the construction thus far developed, the cylinder pressure will force the valve disk 20 against its seat in bore 17; while the suction pressure developed which normally urges the valve 20 away from its seat is counteracted by spring 34, and the valve is thus seated throughout the piston cycle. End thrust is taken up by the ball thrust bearing 33. The valve port 21, when the valve is rotating in a clockwise direction, is brought into registry with exhaust portion 15 of the cylinder head, emitting the exhaust gases therethru, as indicated in Fig. 1. Further rotation of the valve closes the exhaust passage, and the port 21 is subsequently brought into registry with intake passage 14, and a fresh charge of combustible gas is delivered to the cylinder. The intake passage is then closed by the valve disk throughout the compression and firing strokes of the piston.

Lubrication of the rotating valve disk and stem is effected in the following manner. The valve seat 17 in the cylinder head is arcuately channeled or grooved at 36 adjacent the recess 18, and a port 37 formed in the cylinder head is in communication therewith. By means of a suitable union or coupling 38 fitted into the cylinder head at the extremity of the port 37, there is provided a connection with the usual pressure lubrication system of the engine unit. A radial groove 40 is provided in the upper face of the valve disk which extends from the valve stem 22 to the circumferential flange 26 thereon. The groove 40 is positioned relatively behind the port 21 as the valve is rotated. Rotation of the valve disk brings the radial groove 40 into communication with the arcuate channel 36 in the valve seat, and oil under pressure from port 37 is delivered in a film between the top face of the valve and its seat 17 throughout the arc of the channel 36. The bushing 24 is provided with a spiral groove 41 and a counterbore 42 in communication with the radial groove 40 of the valve. Oil delivered across the face of the valve thru the groove 40 is forced upwardly thru the oil groove 41 of the bushing to lubricate the valve stem and its bearing. Oil passing from the bushing 24 flows on to the exterior of the cylinder head from whence it may be drained back to the crank case. By reason of the groove 40 of the valve extending to the flange 26, the said flange and the recess 18 of the cylinder head is likewise lubricated. The supply of oil to the groove 40 is discontinued as the said groove is rotated throughout the unchanneled portion of the seat 17.

As shown in Fig. 1, the diameter of the valve is shown as slightly greater than the bore of the cylinder. The gasket 13 terminates short of the cylinder bore so that the under face of the valve disk has no contact with any fixed part, and wear thereon may be disregarded. The under face of the valve may be so formed as to cause turbulence of the combustible gas if desired. It is evident that the diameter of the valve may be extended and the diameter of the bore increased accordingly, as desired, to permit sufficient space between the recess 18 and oil groove 36 of the cylinder head and also to provide sufficient space between the groove 36 and the intake and exhaust passages 14 and 15 respectively. The above, however, is a matter of design depending upon the characteristics of the particular type of engine being used.

In the above described construction, the large amount of space for water-jacketing in the head serves to dissipate the heat absorbed by the valve parts. The valve mechanism as shown is mounted as a complete unit in the cylinder head, and the complete area of the valve, the valve stem, and the valve seat is constantly lubricated, thereby preventing wear. The valve seating arrangement provided by the valve flange 26 fitting into a corresponding recess 18 in the head maintains the valve true while rotating and thus materially aids in the noiseless operation of the valve mechanism.

It will be seen that the several objects of the invention are achieved and other advantageous results attained. As many changes could be made in carrying out the above invention, it is intended that all matter contained in the above description or shown in the accompanying drawing shall be interpreted as illustrative and not in a limiting sense.

We claim:

1. The combination of an engine cylinder, a head having ports and being cylindrically bored to provide a valve seat and provided with an annular recess, a rotary valve mounted on said seat and having a port and a circumferential flange extending from one face of the valve, the other face of the valve forming the cylinder end, a valve stem extending thru said head, means to rotate said stem and valve, and a spring on said stem operative between said head and said means to maintain the valve and flange seated in said bore and annular recess therein.

2. The combination of an engine cylinder, a head formed with ports and being cylindrically bored to provide a valve seat and having an annular recess therein, an arcuate groove formed in said seat adjacent said recess and in communication with a source of oil supply, a rotary valve having a port and a cylindrical flange thereon extending from one face of the valve, the other face of the valve forming the cylinder end, and a radial groove in said valve adapted to communicate with said arcuate groove of said valve seat, the cylindrical flange of said valve extending into the annular recess of said valve seat.

3. The combination of an engine cylinder, a head having ports therein and being cylindrically bored to provide a valve seat and having an annular recess therein, an arcuate groove formed in said valve seat, a port in said head adapted to deliver oil from a source of supply to said groove, a rotary ported valve seated in the recess of said head and having a circumferential flange extending into said annular recess, a radial groove in said valve disk adapted to communicate with said arcuate groove, a valve stem extending thru a bushing mounted in said head, said bushing being provided with a spiral groove communicating with the radial groove in said valve, means to rotate said valve stem and valve, and means operative between said first named means and head to maintain the valve seated.

Signed at Pittsburgh, Pennsylvania, April, 1927.

ADAM L. HEURICH.
JOSEPH G. HEURICH.
ARTHUR C. STAPEL.